(12) United States Patent
Deneroff

(10) Patent No.: US 6,877,030 B2
(45) Date of Patent: Apr. 5, 2005

(54) METHOD AND SYSTEM FOR CACHE COHERENCE IN DSM MULTIPROCESSOR SYSTEM WITHOUT GROWTH OF THE SHARING VECTOR

(75) Inventor: Martin M. Deneroff, Oakhurst, NJ (US)

(73) Assignee: Silicon Graphics, Inc., Mountain View, CA (US)

(*) Notice: Subject to any disclaimer, the term of this patent is extended or adjusted under 35 U.S.C. 154(b) by 331 days.

(21) Appl. No.: 10/084,088

(22) Filed: Feb. 28, 2002

(65) Prior Publication Data
US 2003/0163543 A1 Aug. 28, 2003

(51) Int. Cl.[7] .................. G06F 12/00; G06F 15/167
(52) U.S. Cl. .................. 709/213; 709/214; 709/216; 709/217; 711/147; 711/141; 711/144; 711/145; 711/154; 712/28; 707/10
(58) Field of Search .................. 709/213, 214, 709/216, 217; 711/147, 141, 148, 152, 153, 154, 144, 145; 712/28; 707/10

(56) References Cited

U.S. PATENT DOCUMENTS

| 5,408,629 | A | * | 4/1995 | Tsuchiya et al. ............. 711/151 |
| 5,592,625 | A | | 1/1997 | Sandberg ............... 395/200.08 |
| 5,617,537 | A | | 4/1997 | Yamada et al. ......... 395/200.01 |
| 5,713,004 | A | * | 1/1998 | Kimmel et al. .............. 711/145 |
| 5,937,431 | A | * | 8/1999 | Kong et al. .................. 711/145 |
| 5,940,860 | A | | 8/1999 | Hagersten et al. .......... 711/147 |
| 6,026,474 | A | | 2/2000 | Carter et al. ................. 711/202 |
| 6,049,476 | A | * | 4/2000 | Laudon et al. ................. 365/52 |
| 6,105,113 | A | | 8/2000 | Schimmel .................... 711/146 |
| 6,115,790 | A | | 9/2000 | Schimmel .................... 711/119 |
| 6,115,804 | A | * | 9/2000 | Carpenter et al. ............. 712/28 |
| 6,249,802 | B1 | * | 6/2001 | Richardson et al. ......... 709/200 |
| 6,263,409 | B1 | * | 7/2001 | Haupt et al. ................. 711/154 |
| 6,279,085 | B1 | * | 8/2001 | Carpenter et al. .......... 711/143 |
| 6,351,791 | B1 | * | 2/2002 | Freerksen et al. .......... 711/146 |
| 6,370,622 | B1 | | 4/2002 | Chiou et al. ................. 711/146 |
| 6,484,240 | B1 | * | 11/2002 | Cypher et al. .............. 711/141 |
| 6,633,967 | B1 | * | 10/2003 | Duncan ....................... 711/207 |
| 2002/0095554 | A1 | * | 7/2002 | McCrory et al. ........... 711/144 |

* cited by examiner

Primary Examiner—Hong Kim
(74) Attorney, Agent, or Firm—Sterne, Kessler, Goldstein & Fox P.L.L.C.

(57) ABSTRACT

The present invention is directed to a method and a system for maintaining cache coherence in a distributed shared memory (DSM) multiprocessor system. The method begins with a receiving of a shared access request by a receiving node, where the receiving node is an arbitrary node having at least one main memory unit containing information desired to be accessed. Then, the method determines whether the shared access request originates from a local node or from a remote node. When the shared access request originates from a local node, the shared access request is processed as a shared access request. If the shared access request is granted, a sharing vector is generated or updated to reflect the sharing local node(s). When the shared access request originates from a remote node, the shared access request is converted to an exclusive access request and the sharing vector is replaced with a pointer to the requesting remote node. This limits the potential size of the sharing vector according to the local nodes.

41 Claims, 6 Drawing Sheets

METHOD AND SYSTEM FOR CACHE COHERENCE IN DSM MULTIPROCESSOR SYSTEM WITHOUT GROWTH OF THE SHARING VECTOR

BACKGROUND OF THE INVENTION

1. Field of the Invention

The present invention relates to methods and systems for cache coherence in distributed shared memory (DSM) multiprocessor systems.

2. Background Art

Computer systems, including uni-processor computer systems and multiprocessor computer systems, typically run multiple processes or threads at a time. Each process requires some amount of physical memory. Often, physical memory is limited and must be allocated among the different processes.

Computer systems typically employ one or more levels of cache memory between main memory and each processor in order to reduce memory access time. Cache memories store information that is retrieved from main memory. Information that is retrieved by a processor must pass through one or more levels of cache in order to get to the processor. Because caches tend to be small and physically close to the processor, sometimes located on-chip with the processor, cached information can generally be accessed much faster than information that is stored in main memory. Thus, caches are typically used to store information that needs to be repeatedly accessed by a processor.

Systems and methods for maintaining cache consistency include directory protocols, where the status of memory is maintained in a centralized directory. Information can be cached in multiple locations by different processes that "share" the information. Alternatively, one process may obtain "exclusive" rights to the information for a period of time. When a process changes information, either in main memory or in a cache location, other instances of the information must be invalidated or updated. This is referred to as maintaining cache consistency. In a distributed shared memory (DSM) system, the directory can be distributed. A centralized controller is responsible for maintaining consistency of shared information. Any time that information stored in a memory location is changed, a check is performed in the centralized directory to determine whether a copy of the information is stored in a cache. If so, each copy is either updated or invalidated.

In large DSM multi-processing systems, maintaining cache coherence can be difficult task. DSM systems typically employ a sharing vector to identify where the information is cached. However, as the size of the DSM system increases (e.g., number of processes or processing nodes), the sharing vector subsequently grows larger, reducing processing speed and increasing the amount of time during which the information in cache is unavailable to other processors. Therefore, there is a need for a better system of maintaining cache coherence in DSM multiprocessor systems.

BRIEF SUMMARY OF THE INVENTION

The present invention relates to systems and methods for cache coherency in distributed shared memory (DSM) multiprocessor systems. The DSM multiprocessor system may comprise a plurality of nodes. Each node may further comprise at least one central processing unit (CPU), a cache memory unit and an optional Input/Output (I/O) unit. The DSM multiprocessor system typically includes one or more operating systems that maintain control (e.g., thread scheduling, memory access, etc.) over the processors.

Typically, when a requestor (e.g., a process executing on a processor), requests access to information, a copy of the information is sent from the memory address, where the information is stored, to a cache address associated with the requestor. The requester then accesses the information from the cache address. For cache coherence purposes, a status indication is typically associated with the memory address, indicating where the information has been cached.

Access requests can be for exclusive access or shared access. The status indication discussed above typically includes an indication of the type of access that has been granted to the requestor. For example, when exclusive access is granted, the status indication shows that exclusive access has been granted identifies the requestor. When shared access is granted, the status indication typically includes a sharing vector that indicates one or more cache locations where copies of the information reside. Additional rules and procedures can be implemented to handle conflicting requests and/or other scenarios.

Modem DSM multiprocessor systems can include tens, hundreds, and even thousands of CPUs. As more requestors obtain shared access to the information, the sharing vector increases in size, sometimes dramatically. This takes up memory space and reduces processing speed.

The present invention reduces the potential size of the sharing vector by introducing the concept of local requestors and remote requesters. Generally, the terms "local" and "remote" are defined in relation to a physical proximity of the requester to requested memory locations. Other definitions for remote and local can also be employed.

In operation, when a requestor requests shared access to information, a determination is made as to whether the requestor is local or remote with respect to the memory location where the information is stored. When the requestor is local, the shared access request is processed in accordance with normal shared access request procedures. When the requestor is remote, the shared access request is converted to an exclusive request and is processed in accordance with exclusive request procedures. Accordingly, the shared access vector is not needed to maintain cache consistency for remote requesters. This substantially reduces memory and processing requirements, especially in larger DSM multiprocessor systems.

In an embodiment, additional rules can be implemented. For example, a new rule can be implemented for a situation where a shared access request from a remote requestor is converted to an exclusive access request, as described above, and a subsequent shared access request is received from a local requestor. An example of the new rule terminates the exclusive access that was granted to the remote requester, and grants shared access to the local requester. The status indication is changed from indicating exclusive access to the sharing vector, indicating shared access to the local requestor. If the remote requester needs the information again, it must re-request it.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Table of Contents

Figure 1:
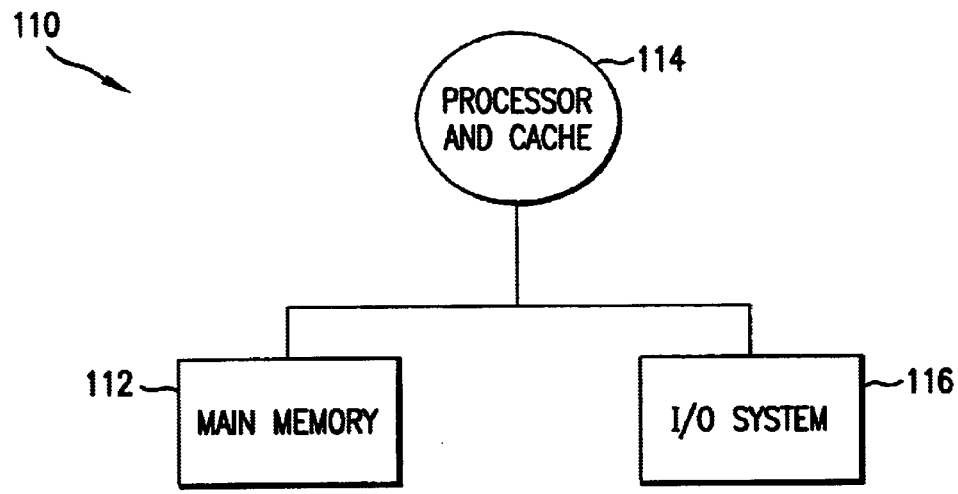
FIG. 1 is a block diagram of a uniprocessor system.

1. Overview.
2. Example Environment.
3. System and Method for Cache Coherence in DSM Multiprocessor System.
4. Conclusions.

1. Overview

The present invention is directed to methods and systems for improving cache coherency in distributed shared memory (DSM) multiprocessor systems. DSM systems typically contain a plurality nodes, which may include a plurality of central processing units (CPU) and memory units attached to those nodes, as well as, an input/output (I/O) module for receiving and transmitting information from a node. A memory unit within a node may contain information that is needed by other nodes, or requesters, for performing various functions and procedures. When one or more requestors are granted shared access to the desired information, a sharing vector identifies the sharing requesters. The sharing vector is used for maintaining cache consistency. When a requester is granted exclusive access to the desired information, a pointer (a binary number of the requesting node) is stored instead of a sharing vector. For example, the size of the pointer is log(N) bits, while the size of the sharing vector is N bits, where N is the number of nodes in the system.

The sharing vector increases in size as the number of sharing requestors increases. As the sharing vector increases in size, it consumes more memory and slows down the processing of the functions and procedures by the system overall, as well, as each particular node. Therefore, there is a need for a better system that would reduce the size of the sharing vector.

In accordance with the present invention when a request for shared access originates from a node that is remote from a node where the requested information resides, the shared access request is converted to a exclusive access request. This eliminates the need for maintaining a sharing vector for the requested information. In an embodiment, a decision as to whether a requester is a remote from the requested information is based on the physical addresses of the requestors and the requested information.

In one embodiment, an address comparison is performed between upper bits of the address of the requesting node and upper bits of the address of the requested information. In another embodiment, a node may store a table of addresses of other nodes that may or may not be granted shared access. In other words, if one node sends a request for shared information access to another node, the latter node will compare requesting node's address against the table of addresses. If the address matches any addresses in the table, the request for shared information access will be either granted or be converted to an exclusive request.

In an embodiment, if a local node sends a request for access to information which is held exclusive by a remote node, the remote node's access is removed and access is granted to the local node.

2. Example Environment

The present invention can be implemented in a distributed shared memory (DSM) multiprocessor systems. However, the above implementation should not be understood as limiting the use of the present invention to the DSM systems. The following is a discussion of systems that will be useful in understanding environments in which the present invention can be implemented.

Referring to FIG. 1, a uni-processor system 110 includes a single processor and cache node 114 coupled to a main memory 112. Main memory 112 stores information for use by processor and cache node 114. An input and output I/O system 116 provides interfacing to peripheral devices, such as, for example, user interfaces and memory devices which can include computer terminals and memory disks.

Figure 4:
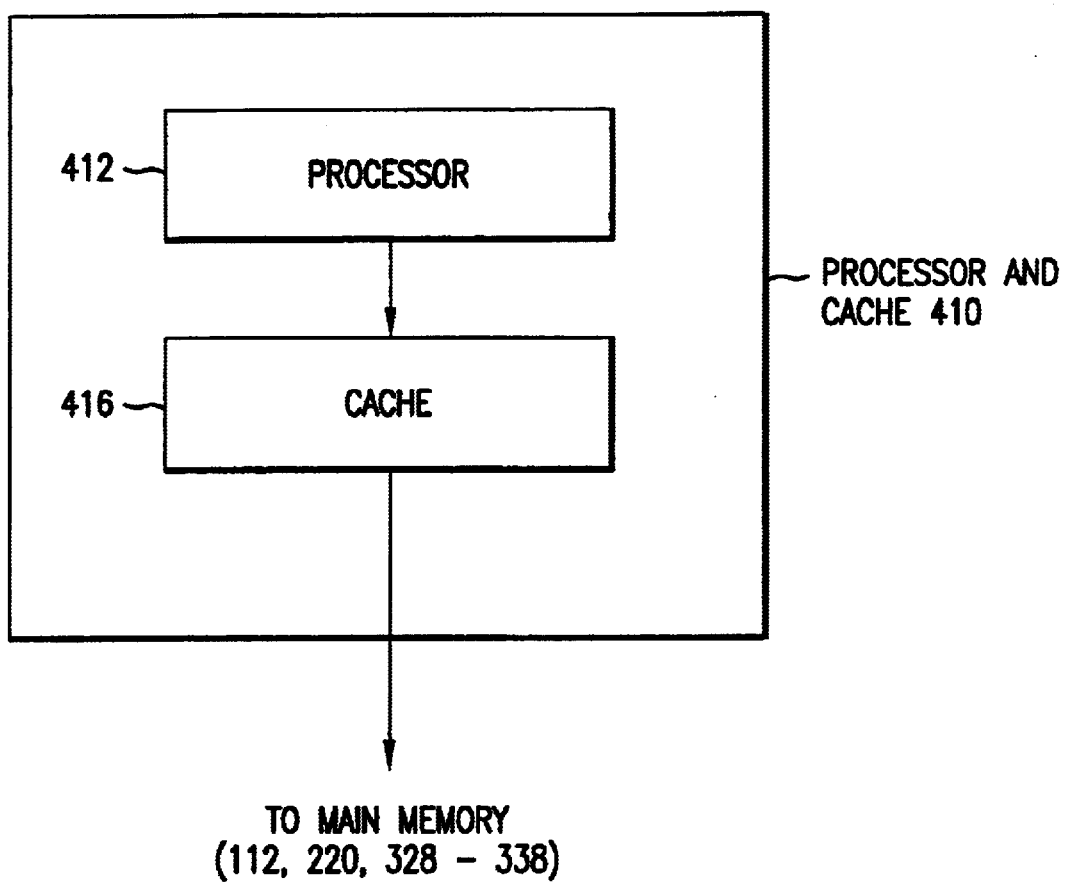
FIG. 4 is a block diagram of a processor and a cache node that can be employed by any of the processor systems illustrated in FIGS. 1–3.

Referring to FIG. 4, processor and cache node 114 can be implemented as processor and cache node 410. Processor and cache node 410 includes a processor 412 coupled to a main memory, which can be main memory 112, via a cache 416. For clarity, only a single processor 412 and cache memory 416 are shown. One skilled in the art will recognize that multiple processors and multiple levels of cache can be employed.

Cache 416 is provided for caching information retrieved from a main memory such as main memory 112. Once information is cached in cache 416, processor 412 can retrieve information from cache 416. Processor 412 can generally retrieve information from cache 416 faster than it can access information in main memory 112 because of the proximity of cache 416 to processor 412 and because the memory parts that are used to make cache 416 are faster than the memory parts that are used to make main memory. Cache 416 can include one or more levels of cache, as dictated by needs of users.

In operation, processor 412 processes threads for one or more processes. When processor 412 needs to access information stored in main memory 112, an access request is sent. If processor 412 is permitted access to the requested information, main memory 112 returns the requested information to cache 416. Once the requested information is stored in cache 416, processor 412 can access the information as necessary. In the future, processor 412 can access information in cache 416 without accessing main memory 112.

Figure 2:
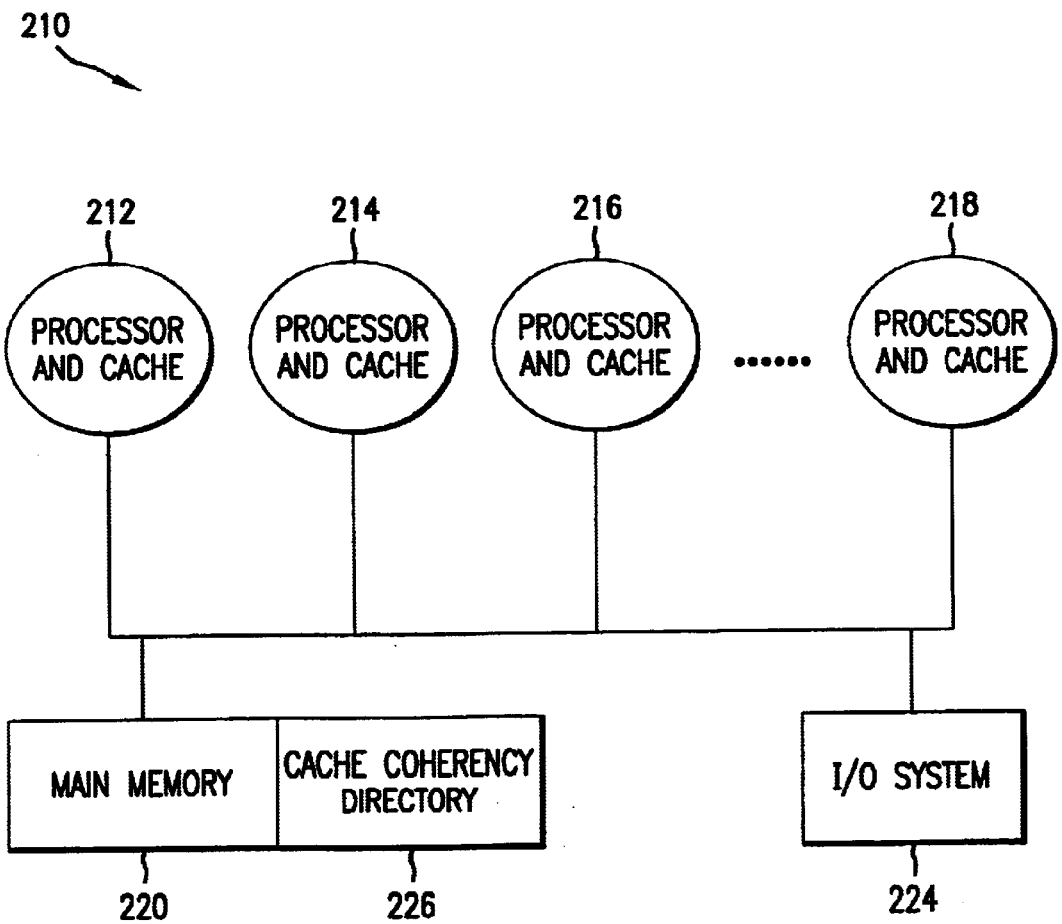
FIG. 2 is a block diagram of a centralized symmetric shared memory, multiple processor (SMP) system.

Referring to FIG. 2, an example of a centralized, shared memory, symmetric multi-processing (SMP) system 210 includes a plurality of processor and cache nodes 212–218. SMP 210 can include any number of nodes 212–218. Processor and cache nodes 212–218 are coupled to a centralized, shared, main memory 220 via a bus 222. An I/O system 224 can be provided for interfacing SMP 210 with various external and peripheral devices, such as computer terminals and memory disks.

Processor and cache nodes 212–218 can be implemented, for example, as processor and cache node 410, in FIG. 4, described above. Alternatively, one or more processor and cache nodes 212–218 can employ a plurality of processors 412 and caches 416. In either implementation, SMP 210 permits multiple processors 412 to process a plurality of tasks in parallel. Centralized, shared memory 220 permits multiple processors 412 to share information between tasks.

Figure 3:
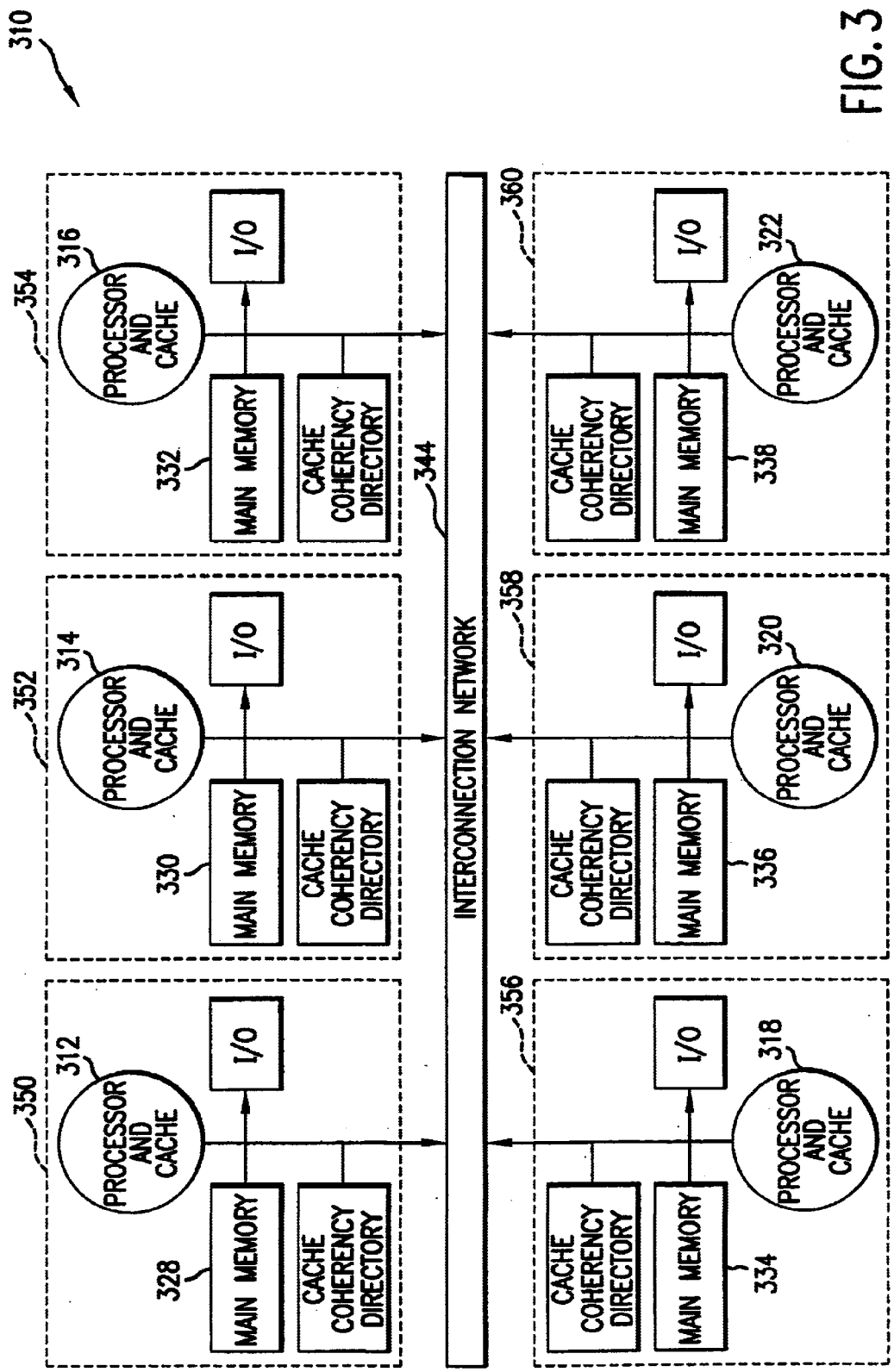
FIG. 3 is a block diagram of a distributed shared memory multiprocessor system (DSM)

Referring to FIG. 3, a distributed shared memory (DSM) system 310 includes a number of processing nodes 350–360, interconnected via an interconnection network 344. DSM 310 can include any number of processing nodes 350–360. Each processing node 350–360 is illustrated with a processor and cache node 312–322 and a portion of distributed shared memory 328–338. As would be apparent to a person skilled in the art, one or more of processing nodes 350–360 need not employ a processor and cache node.

Processor and cache nodes 312–322 can be implemented, for example, as processor and cache node 410 in FIG. 4, where each processor 412 accesses a portion of shared memory 328–338 through one or more levels of cache 416. Alternatively, one or more processor and cache nodes 312–322 can have a plurality of processors 412 and caches 416.

Distributed shared memory portions 328–338 are accessed by the processors within processing nodes 350–360 as if they formed a single continuous block of physical memory. As would be apparent to a person skilled in the art, one or more of processing nodes 350–360 need not employ a portion of shared memory.

In the example of FIG. 3, each processing node 350–360 is shown with an optional input/output (I/O) device. As would be apparent to a person skilled in the art, one or more of processing nodes 350–360 need not have an I/O device. Moreover, different types of I/O devices and combinations of external peripherals and resources can be used in a DSM system. Thus, one or more of processing nodes 350–360 can include any combination of processors or no processors, shared memory or no shared memory and I/O or no I/O.

In the example of FIG. 3, each processing node 350–360 is shown with an cache consistency directory. Directory information can be associated with a memory controller and/or with cache tags.

By distributing physical or main memory 328–338 throughout DSM 310, each processing node 350–360 can include a portion of main memory. This physical proximity between processor and memory reduces memory latency with respect to the processor and memory within a processing node.

Uni-processor systems, SMPs and DSMs, such as systems 110, 210 and 310 described with reference to FIGS. 1–3, are well known. Further details of such systems can be found in, for example, Hennessy and Patterson, *Computer Architecture A Quantitative Approach*, 2d Ed. (Morgan and Kaufmann Publ.: USA 1996), incorporated herein by reference in its entirety.

3. System and Method for Cache Coherence in DSM Multiprocessor System

The present invention reduces the potential size of the sharing vector in distributed shared memory multiprocessor systems by converting certain shared access requests to exclusive access requests, thereby eliminating the need for the sharing vector in these circumstances. The present invention can be implemented in software, hardware, firmware or any combination thereof.

The problem of large vectors is now described with respect to FIG. 3. When a processing node 352 needs information, a request is sent out, typically over the interconnection network 344. Where the requested information resides in main memory 328 of processing node 350, the request from processing node 352 is routed to the processing node 350. If the request is a shared access request, and the request is granted, a sharing vector associated with the main memory 328 is generated or updated to reflect that access has been provided to the processing node 352.

If the request is an exclusive access request, there is no need for a sharing vector. Instead, an indication is stored showing that exclusive access has been granted to processing node 352. Sharing vectors and indications of exclusive access are used by a cache consistency scheme.

As more processing nodes request shared access to the same information, the sharing vector increases in size, which requires more memory space and slows down processing of the system overall.

In accordance with the present invention, the potential size of the sharing vector is reduced by reducing the potential number of sharing entities. This is accomplished by distinguishing between local nodes and remote nodes. Local and remote nodes are defined relative to a "home" node, where the requested information resides. In the example above, where the processing node 352 requests information from the processing node 350, the processing node 350 is referred to as the home node. For this request, the requestor will be defined as local or remote with respect to the home node 350. In accordance with the present invention, if a shared access request originates from a remote node, the shared request is converted to an exclusive request. If the shared access request originates from a local node, the request is processed as a shared access request.

Therefore, the nodes 350–360 may have sharing vectors directed to other nodes' cache units if such nodes require information access. The system 310 in FIG. 3 shows six processing nodes, however, it is understood by one skilled in the art that smaller and larger systems are possible. Generally, having a large plurality of processing nodes potentially results in larger sharing vectors. Larger sharing vectors reduce the speed of processing of information. This is typically because of the time it takes to handle the larger sharing vectors.

Figure 6:
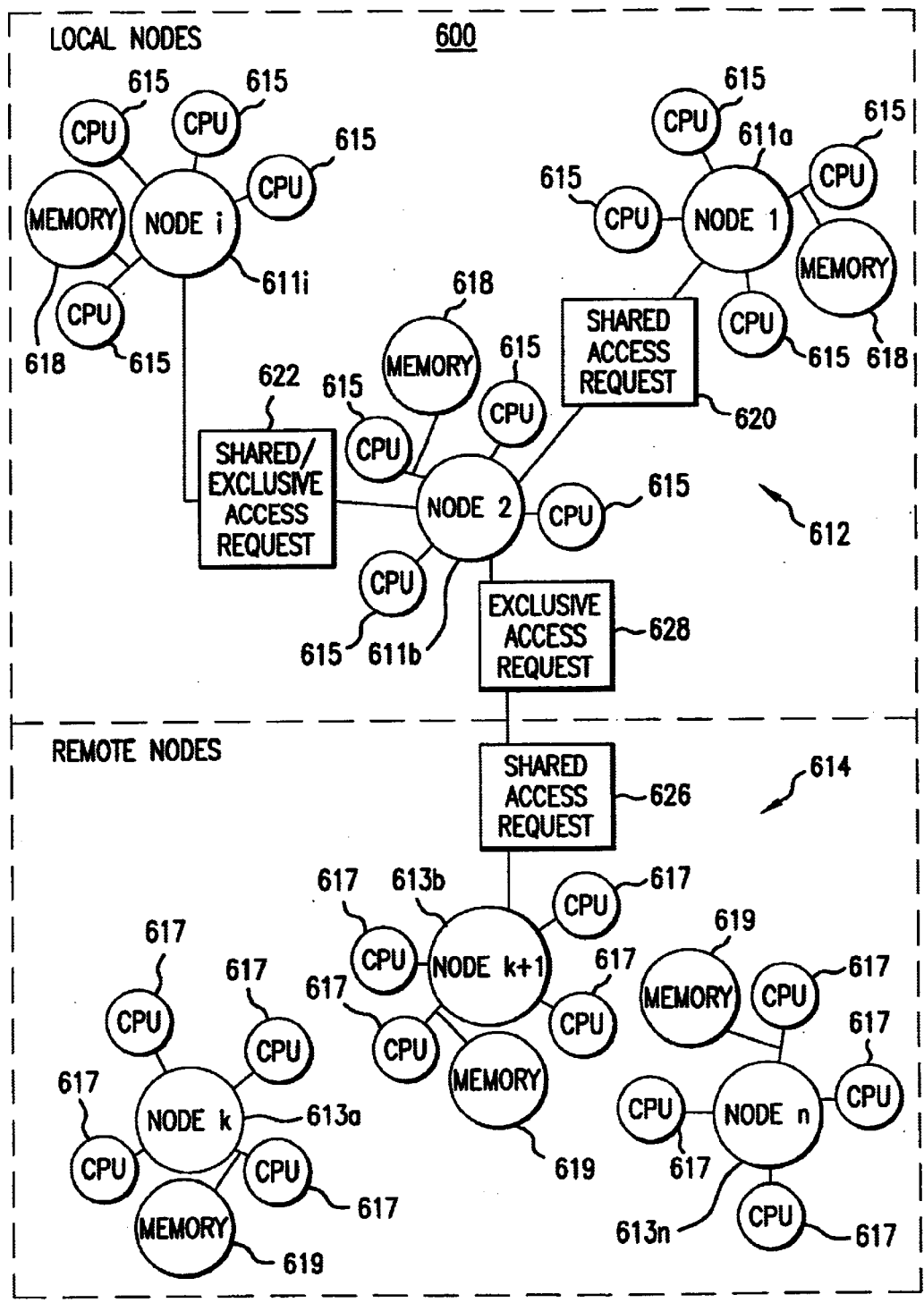
FIG. 6 is a block diagram of an embodiment of a DSM multiprocessor system that can employ the present invention.

Examples of the present invention are now described with reference to FIG. 6. Referring to FIG. 6, a DSM system 600 according to the embodiments of the present invention is shown. The system 600 has a plurality of processing nodes, or requesters, 611 and 613. Processing nodes 611 are designated as local nodes, or local requesters. Processing nodes 613 are designated as remote nodes, or remote requestors. The nodes may be any processing units in the system, cache memory locations or any other media that is capable of either storing information and/or processing functions or procedures.

The term "home node" is a node where requested information resides. The term "home node" can designate a processing unit or a memory location or any other media that is capable of storing information and from which other processing units in the DSM multiprocessor system may request information for. The term "home node" is relative and is not intended to limit the scope of this invention and is used for the purposes of illustration. Therefore, for the purposes of this discussion only, Node 2 is designated as a home node 611*b*. It is understood by one skilled in the art, that generally any node in a DSM multiprocessor system may request information from any other node in the same system and not only from the node that is designated as the home node.

The local nodes are positioned in a node group 612 in relatively close physical proximity to the home node 611b. The remote nodes are positioned in a node group 614 and are typically not in relative close physical proximity to the home node 611b.

In the example of FIG. 6, there are i local processing nodes 611 in the node group 612 and there are n remote processing nodes in the node group 614. It is understood by one skilled in the art that the numbers i and n may vary according to the requirements of the system 600.

Each local node 611 may have a plurality of central processing units (CPU) 615 and a plurality of memory units 618 (as shown in FIG. 6, there are four CPU 615 and a single memory unit 618 per each node 611). Similarly, each remote node 613 may have a plurality of CPU 617 and a plurality of memory units 619 (as shown in FIG. 6, there are four CPU 617 and a single memory unit 619 per each node 613). It is understood by one skilled in the art that other embodiments are possible.

An operational example of the invention is now described. The local node 611a sends a shared access request 620 to the home node 611b. The request 620 is processed by the home node 611b as a shared access request because the node 611a is a local node with respect to the home node 611b.

If a shared access request comes from a remote node, it is converted to an exclusive access request. For example, when a remote node 613b sends a shared access request 626 to the home node 611b, the shared access request 626 is converted to an exclusive access request 628.

Once the exclusive access request 628 is granted, the home node 611b stores a pointer to the remote node 613b address. Since, the access is exclusive, there is no need to have a sharing vector. In other words, instead of having to potentially store a bit per each node requesting shared access to the information, a binary number (or a node number or a CPU number) is stored by the home node 611b referencing the location of the remote node 613b.

In an embodiment, a subsequent shared access request 622 from a local node 611i terminates the exclusive access of the remote node 613b. The local node 611i is then granted shared or exclusive access to the information.

The following is a description of a method 510 in accordance with the embodiments of the present invention. The method 510 is described below with respect to the DSM 600 for illustrative purposes. The method 510 is not, however, limited to the DSM 600. Based on the description herein, one skilled in the relevant art(s) will understand that the method 510 can be implemented in other DSM systems as well.

Figure 5A:
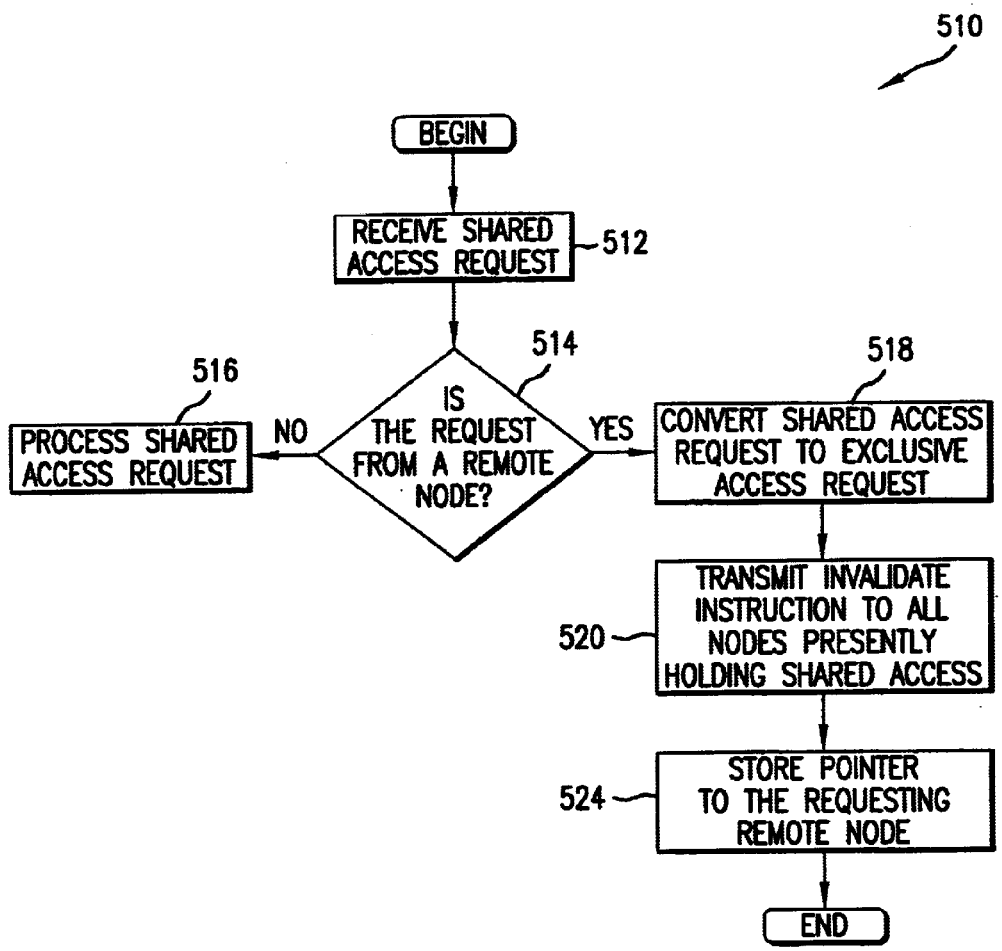
FIG. 5a is a flow chart of an embodiment of a method for maintaining cache coherence in DSM multiprocessor systems.

FIG. 5a is a flow chart showing the method 510 for maintaining cache coherence according to embodiments of the present invention. The method 510 begins at a step 512, where a shared access request is received by the node containing information, or the home node, as it is described above. In an embodiment, the home node is any node in the DSM multiprocessor system containing a portion of the main memory. The home node's main memory unit contains information that may be requested by various nodes in the multiprocessor system. Such information may be requested for implementation of various functions and procedures that other nodes in the system may be running. Requests may be to read or write to the main memory location. If a node requires a use of a particular information stored in the main memory unit of the home node, such node would send an access request to the home node for such information. The access request can be a shared access request or an exclusive access request.

In step 514, a determination is made as to whether the shared access request comes from a local node (a local requester) or a remote node (a remote requester). In an embodiment, step 514 is performed based on comparing addresses of the requestors and the requested information. Alternatively, the home node stores a table of addresses of the nodes in the systems, where the addresses can be sorted by a proximity parameter of the nodes. The proximity parameter determines whether the node sending the request for shared access is a remote node or a local node with respect to the home node. When a requestor node sends a request for shared access, the home node reads the requesting node's address and compares the requesting node's address with the table of addresses. If the requesting node's address matches an address stored in the table of addresses, the requesting node is determined to be a local node and the shared access request is processes as a shared access request. If the requesting node's address does not match an address stored in the table of addresses, the requesting node is determined to be a remote node and the shared access request is converted to an exclusive access request.

In another embodiment, a comparison is performed between upper bits of the requesting node's address and upper bits of the home node's address. If there is a match between the bits then the requesting node is determined to be a local node and the request for shared access is processed as a shared access request. If there is not a match, the requesting node is determined to be a remote node and the request for shared access is converted to an exclusive access request.

In step 514, if it is determined that shared access request originated from a local node, processing proceeds to step 516, where the shared access request is processed as a shared access request. If the shared access request is granted, a sharing vector will typically be generated and/or updated to identify the requesting local node as having shared access to the requested information.

In step 514, if it is determined that the shared access request originated from a remote node, processing proceeds to step 518, where the shared access request is converted to an exclusive access request. This is illustrated in FIG. 6, where the shared access request 626 is converted to an exclusive access request 628. The exclusive access request is then processed in accordance with exclusive access request procedures, such as, for example, step 520 and/or step 524, which are now described.

For example, where the requested information is shared among other requestors, and where exclusive access is to be provided to the remote node, in step 520, the home node transmits an invalidate instruction to other nodes that previously cached copies of the requested information. This prevents other processes from using cached copies of the information while the remote node has exclusive access to the information.

Since the remote node has been granted exclusive access, there is no need for the sharing vector. Instead, in step 524, a pointer is stored to identify the remote node that has been granted exclusive access to the requested information. The pointer is used by a cache coherence scheme in place of the sharing vector. The invention thus limits the potential size of the sharing vector according to the number of local nodes.

In other words, the problem of having a large shared vector potentially identifying remote nodes as well as local nodes is substantially eliminated.

Figure 5B:
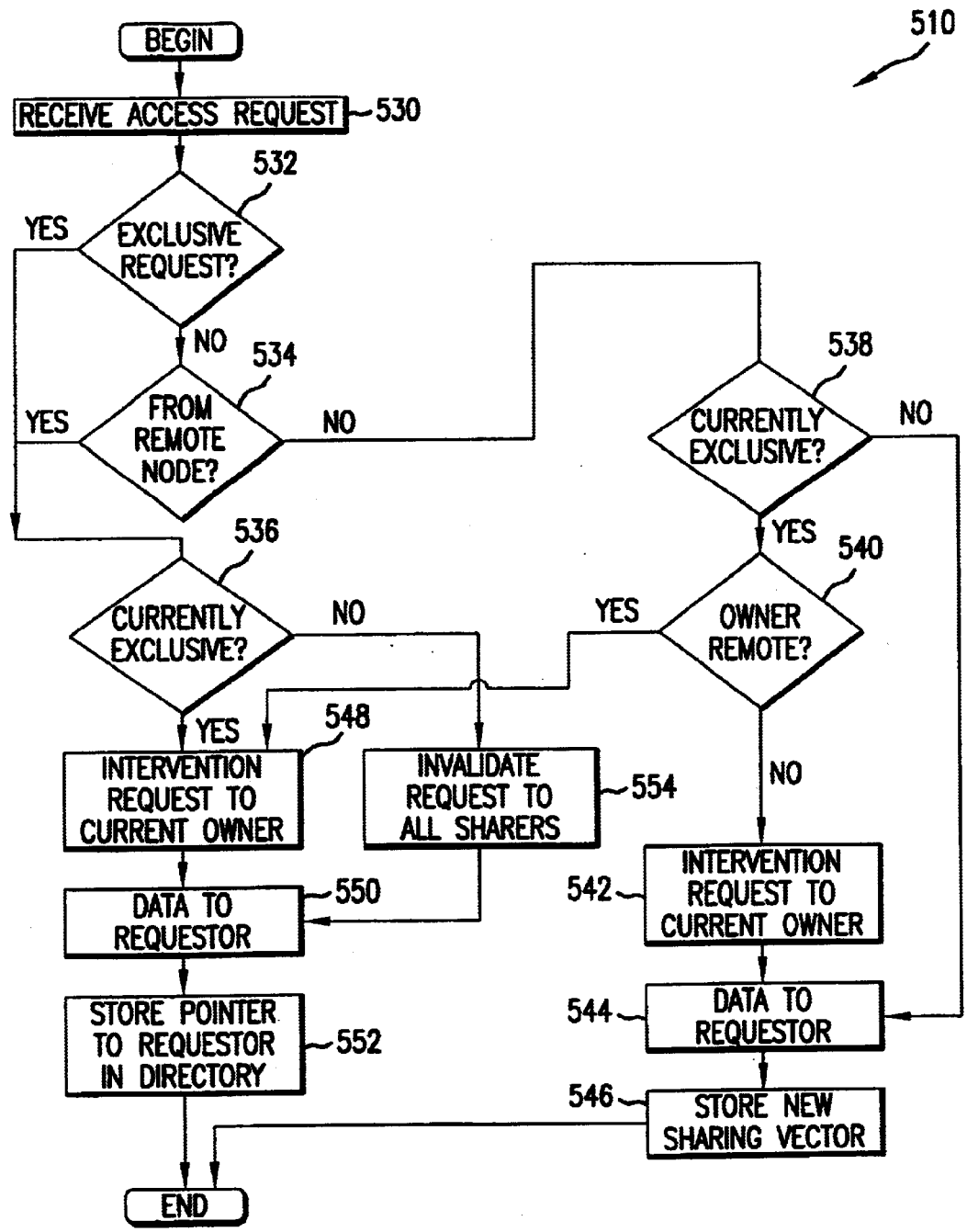
FIG. 5b is a flow chart of another embodiment of a method for maintaining cache coherence in DSM multiprocessor systems.

Referring to FIG. 5b, another embodiment of the present invention's method 510 is shown. In this embodiment, even if the remote node is granted the exclusive access request by the home node, as described by steps 512–524 in FIG. 5a, a local node may terminate the exclusive access rights of the remote node. This is illustrated in FIG. 6, where the remote node 613b has been granted exclusive access and the local node 611i subsequently requests shared access.

In FIG. 5b, the method 510 receives an access request in step 530. The method 510 then proceeds to step 532, where the process determines whether the received access request is an exclusive request. If, in step 532, the access request is not an exclusive access request (i.e., a shared access request), then the process determines whether the shared access request came from a remote node in step 534. Step 534 can be implemented as previously described. For example, an address comparison can be performed.

If the request is either an exclusive request (as is determined in step 532) or comes from a remote node (as is determined in step 534), then the method proceeds to step 536, where the process determines whether the requested information is currently held exclusively by another requestor. If, in step 536, the requested information is currently held exclusively by another requester, an intervention request is sent to the exclusive owner of the information, as shown in step 548.

The function performed in step 548 insures that if the current exclusive owner has modified the information, the modified information will be returned to the home node before the new requester is granted exclusive access. Once the intervention request is sent by the exclusive owner of the requested information, the process proceeds to step 550.

In step 550, the new requestor (e.g., a remote node) is granted the exclusive access to the requested information. For example, referring to FIG. 6, the node 613b may be the new requestor that has an exclusive access to the requested information located at the node 611b.

To indicate that the new requestor now has exclusive access to the requested information, in step 552, a pointer is stored by the home node indicating that exclusive access has been provided to the remote requestor.

Referring back to step 536, if the system determines that the requested information is not currently held exclusive by another requestor, the method proceeds to send an invalidate instruction to all nodes presently holding shared access to the same information, as shown in step 554. Processing then proceeds to steps 550 and 552, as was described earlier.

Referring back to step 532, if the received access request is not an exclusive request, the process proceeds to step 534. Also, referring back to step 534, if the process determines that the received access request does not come from a remote node, the process proceeds to step 538.

In step 538 (which is similar to step 536), the process determines whether the requested information is not currently held exclusively by another requester. If, in step 538, the requested information is not currently held exclusively by another requester, the process proceeds to step 544.

Step 544 is similar to step 550, where the requester is granted access to the requested information. However, in step 544, the requestor is a local node (determined by step 534) and, therefore, given a shared access to the requested information.

In step 546, following step 544, a new sharing vector is stored by the node where the requested information is located. For example, referring to FIG. 6, the node 611b would store a new sharing vector when a local node 611i requests a shared access to the requested information located at the node 611b.

Referring back to step 538, if the process determines that the requested information is currently held exclusively by another requestor, the process proceeds to step 540. In step 540, the process determines whether the home node is remotely located with respect the requestor's location. If it is determined that the current exclusive owner of the requested information is remote with respect to the home node, processing proceeds to step 548. Step 548 along with steps that follow it are described above.

If in step 540, the process determines that the requester is local with respect to the home node, then processing proceeds to step 542. The function that is performed in step 542 (which is similar to step 548), insures that if the current exclusive owner has modified the information, the modified information will be returned to the home node before the new requestor is granted exclusive access. In step 542, the local requestor terminates exclusive information access of the original requestor. The original requestor's information request becomes a shared access request.

Once the intervention request is sent to the exclusive owner of the requested information, the process proceeds to step 544. Step 544 and the following step 546 were described earlier. In step 544, the information access is given to the local requestor and a sharing vector is stored by the system in step 546.

If the remote node requires further access to the information, it must re-request it, such as by going through step 530 again. Alternatively, the remote node's exclusive access is replaced with shared access so it can share access to the information with the local requester.

The method 510 as described above may be implemented in a directory based protocol, although other implementations are possible.

4. Conclusion

Example embodiments of the methods, systems, and components of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalents.

What is claimed is:

1. A method for cache coherence in a distributed shared memory (DSM) multiprocessor system comprising:
   (1) receiving a shared access request for information;
   (2) determining whether the shared access request originates from a local node or from a remote node;
   (3) processing the shared access request as an exclusive access request when the shared access request originates from the remote node; and
   (4) processing the shared access request when the shared access request originates from the local node.

2. The method of claim 1, wherein said step of determining whether the shared access request originates from the local node or the remote node further comprises determining a memory location where the information is stored.

3. The method of claim 1, wherein said step of processing the shared access request as an exclusive access request further comprises transmitting an invalidate instruction to other local or remote nodes to eliminate copies of the requested information from other local or remote nodes.

4. The method of claim 1, wherein said step of determining whether the shared access request originates from the local node or the remote node further comprises comparing upper bits of an address of a shared access requestor with upper bits of an address of a receiving node.

5. The method of claim 4, wherein said step of processing the shared access request as the exclusive access request further comprises converting the shared access request to the exclusive access request if the upper bits of the address of the shared access requestor match the upper bits of the address of the receiving node.

6. The method of claim 1, wherein said step of determining whether the shared access request originates from the local node or the remote node further comprises comparing an address of a shared access requestor with a table of addresses stored by a receiving node.

7. The method of claim 6, wherein said step of processing the shared access request as the exclusive access request further comprises converting the shared access request to the exclusive access request if the address of the shared access requestor matches at least one address in the table of addresses stored by the receiving node.

8. The method of claim 1, wherein the method further comprises:
    (5) eliminating copies of the requested information from other local or remote nodes when the shared access request is converted to the exclusive access request;
    (6) storing a pointer to a shared access requestor, a location associated with the shared access request or where the requested information is cached, when the shared access request is remotely originated;
    (7) determining whether the shared access request is valid;
    (8) terminating an exclusive access when the exclusive access request is no longer valid; and
    (9) returning information requested by the shared access request to cache.

9. The method of claim 1, wherein a shared access request from a remote node has been processed as an exclusive access request, the method further comprising:
    (5) receiving a subsequent shared access request from the local node at a receiving node;
    (6) transmitting an invalidate instruction from the receiving node to the remote node, when the local node transmits the shared access request;
    (7) terminating an exclusive access of the remote node; and
    (8) processing the shared access request of the local node as the exclusive access request.

10. The method of claim 9, wherein step (6) further comprises comparing upper bits of an address of a shared access requestor of the local node with upper bits of the address of the receiving node.

11. The method of claim 10, wherein step (8) further comprises converting the shared access request of the local node to the exclusive access request if the upper bits of the address of the shared access requestor of the local node match the upper bits of the address of the receiving node.

12. The method of claim 9, wherein step (6) of transmitting another invalidate instruction further comprises comparing upper bits of an address of the shared access request of the local node with a table of addresses stored by the receiving node.

13. The method of claim 12, wherein step (8) further comprises converting the shared access request of the local node to the exclusive access request if the address of the shared access request of the local node matches at least one address in the table of addresses stored by the receiving node.

14. The method of claim 9, wherein the method further comprises:
    (9) storing a pointer to the shared access requestor of the local node;
    (10) determining whether the shared access request of the local node is valid;
    (11) terminating the exclusive access request of the local node when the exclusive access request is no longer valid; and,
    (12) returning information requested by the shared access request of the local node to cache.

15. A method for cache coherence in a distributed shared memory (DSM) multiprocessor system having a directory-based protocol comprising:
    (1) receiving a shared access request for information by a receiving node;
    (2) determining whether the shared access request originates from a local node or from a remote node;
    (3) processing the shared access request as an exclusive access request when the shared access request originates from the remote node;
    (4) processing the shared access request when the shared access request originates from the local node;
    (5) transmitting an invalidate instruction to other local or remote nodes to eliminate copies of the requested information from the other local or remote nodes;
    (6) eliminating copies of the requested information from other local or remote nodes once the shared access request is converted to the exclusive access request;
    (7) storing a pointer to a shared access requestor when the shared access request is remotely originated;
    (8) determining whether the shared access request is valid;
    (9) terminating an exclusive status when the exclusive access request is no longer valid; and
    (10) returning information requested by the shared access request to cache.

16. The method of claim 15, wherein step (2) further comprises comparing upper bits of an address of the shared access requestor with upper bits of an address of the receiving node.

17. The method of claim 16, wherein step (3) further comprises converting the shared access request to the exclusive access request if the upper bits of the address of the shared access requestor match the upper bits of the address of the receiving node.

18. The method of claim 15, wherein step (2) further comprises comparing address of the shared access requestor with a table of addresses stored by the receiving node.

19. The method of claim 18, wherein step (3) further comprises converting the shared access request to the exclusive access request if the address of the shared access requestor matches at least one address in the table of addresses stored by the receiving node.

20. The method of claim 15, wherein the method further comprises:

(11) receiving a shared access request from the local node;

(12) transmitting an invalidate instruction from the receiving node to the remote node, when the local node transmits the shared access request;

(13) terminating the exclusive access of the remote node;

(14) processing the shared access request of the local node as the exclusive access request.

21. The method of claim 20, wherein step (12) further comprises comparing upper bits of an address of the shared access requestor of the local node with upper bits of the address of the receiving node.

22. The method of claim 21, wherein step (14) further comprises converting the shared access request of the local node to the exclusive access request if the upper bits of the address of the shared access requestor of the local node match the upper bits of the address of the receiving node.

23. The method of claim 20, wherein step (12) further comprises comparing upper bits of an address of the shared access requestor of the local node with a table of addresses stored by the receiving node.

24. The method of claim 23, wherein step (14) further comprises converting the shared access requestor of the local node to the exclusive access request if the address of the shared access requestor of the local node matches at least one address in the table of addresses stored by the receiving node.

25. The method of claim 20, wherein the method further comprises:

(15) storing a pointer to the shared access requestor of the local node;

(16) determining whether the shared access request of the local node is valid;

(17) terminating an exclusive access of the local node when the exclusive access request is no longer valid; and,

(18) returning information requested by the shared access request of the local node to cache.

26. A method for cache coherence in a distributed shared memory (DSM) multiprocessor system comprising:

(1) receiving a first shared access request by a receiving node, wherein the receiving node contains shared information;

(2) receiving a second shared access request by the receiving node;

(3) processing one of a first and a second shared access requestor as an exclusive access request; and (4) transmitting an invalidate instruction to other of the first and the second shared access requestor.

27. The method of claim 26, wherein step (3) further comprises (5) determining whether one of the first and the second shared access requestor originates from a local node or a remote node;

(6) processing the first shared access requestor as the exclusive access request when the first shared access request originates from the remote node;

(7) transmitting the invalidate instruction to the second shared access requestor.

28. The method of claim 26, wherein step (3) further comprises:

(5) determining whether one of the first and the second shared access requestors originates from a local node or a remote node;

(6) processing the second shared access request as the exclusive access request when the first shared access request originates from the remote node;

(7) transmitting the invalidate instruction to the first shared access requestor.

29. The method of claim 26, wherein the method further comprises processing as the shared access request to one of the first and the second shared access request when the other of the first and the second shared access originates from a local node.

30. The method of claim 26, wherein the method further comprises invalidating an exclusive access of one of the first and the second shared access request originating from a remote node when the other of the first and the second shared access request originates from a local node.

31. The method of claim 30, wherein said invalidating step further comprises:

(5) comparing upper bits of an address of one of the first and the second access requestors with upper bits of the address of the receiving node;

(6) processing one of the first and the second shared access request as the exclusive access request if the upper bits of the address of one of the first and the second shared access requestors match the upper bits of the address of the receiving node.

32. The method of claim 30, wherein said invalidating step further comprises:

(5) comparing upper bits of an address of one of the first and the second access requestors with a table of addresses stored by the receiving node;

(6) processing one of the first and the second shared access request as the exclusive access request if the upper bits of the address of one of the first and the second shared access requestors match the table of addresses stored by the receiving node.

33. The method of claim 32, wherein the method further comprises:

(7) storing a pointer to one of the first and the second shared access requestors;

(8) determining whether the one of the first and the second shared access request is valid;

(9) terminating an exclusive access of one of the first and the second shared access requestors when one of the first and the second shared access request is no longer valid; and,

(10) returning information requested by one of the first and the second shared access requestors to cache.

34. A system for maintaining cache coherency in a distributed shared memory (DSM) multiprocessor systems, comprising:

a plurality of processing nodes, wherein each said node is attached to at least one central processing unit (CPU) and a memory unit;

at least one receiving node for receiving a shared access request;

a means for determining whether said shared access request originates from said local node or from said remote node;

a plurality of shared memory vectors, wherein each said shared memory vector defines either said local node requesting information sharing from said receiving node or said remote node requesting information sharing from said receiving node;

an exclusive memory access pointer, wherein said exclusive memory access pointer points to said remote node in the DSM multiprocessor system that has been granted an exclusive access to information in said receiving node;

a storage unit for storing said exclusive memory access pointer; and, a deleting means for eliminating said exclusive memory access pointer, when said exclusive memory access pointer becomes invalid.

35. The system of claim 34, wherein the system operates using directory-based protocol environment.

36. The system of claim 34, wherein said deleting means further comprises a means for transmitting of an invalidate instruction to other said processing nodes once said exclusive memory access pointer points to said remote node in the DSM multiprocessor system.

37. The system of claim 34, wherein the system further comprises a means for transmitting another invalidate instruction to said remote node when said receiving node has received said shared access request from said local node, whereby an address of said local node matches an address of said receiving node.

38. A system for maintaining cache coherency using a directory-based protocol environment in a distributed shared memory (DSM) multiprocessor systems, comprising:

a plurality of processing nodes, wherein each said node is attached to at least one central processing unit (CPU) and a memory unit;

at least one receiving node for receiving a shared access request;

a means for determining whether said shared access request originates from said local node or from said remote node;

a plurality of shared memory vectors, wherein each said shared memory vector defines either said local node requesting information sharing from said receiving node or said remote node requesting information sharing from said receiving node;

an exclusive memory access pointer, wherein said exclusive memory access pointer points to said remote node in the DSM multiprocessor system that has been granted an exclusive access to information in said receiving node;

a means for transmitting an invalidate instruction to other said processing nodes once said exclusive memory access pointer points to said remote node in the DSM multiprocessor system;

a storage unit for storing said exclusive memory access pointer; and, a deleting means for eliminating said exclusive memory access pointer, when said exclusive memory access pointer becomes invalid.

39. A system for maintaining cache coherency using a directory-based protocol environment in a distributed shared memory (DSM) multiprocessor systems, comprising:

a means for receiving a shared access request for information;

a means for determining whether the shared access request originates from a local node or from a remote node;

a means for processing the shared access request as an exclusive access request when the shared access request originates from the remote node;

a means for processing the shared access request when the shared access request originates from the local node.

40. A system for maintaining cache coherency using a directory-based protocol environment in a distributed shared memory (DSM) multiprocessor systems, comprising:

a means for receiving a shared access request for information by a receiving node;

a means for determining whether the shared access request originates from a local node or from a remote node, wherein said local node is physically proximate to said receiving node, wherein said remote node is physically distant from said receiving node;

a means for processing said access request differently depending on whether said access request originates from said local node or from said remote node.

41. A computer program product comprising a computer useable medium having computer logic stored therein, said computer program logic enabling a computer system to maintain cache coherency in a distributed shared memory (DSM) system, wherein said computer program logic comprises:

a first function that enables the computer to receive a shared access request for information;

a second function that enables the computer to determine whether the shared access request originates from a local node or from a remote node;

a third function that enables the computer to process the shared access request as an exclusive access request when the shared access request originates from the remote node; and a fourth function that enables the computer to process the shared access request when the shared access request originates from the local node.

* * * * *